United States Patent
Checchin et al.

(10) Patent No.: US 10,421,513 B2
(45) Date of Patent: Sep. 24, 2019

(54) SADDLE FOR A VEHICLE

(71) Applicant: Selle Royal S.p.A., Pozzoleone (Vicenza) (IT)

(72) Inventors: Claudio Checchin, Pozzoleone (IT); Barbara Bigolin, Pozzoleone (IT)

(73) Assignee: SELLE ROYAL S.P.A., Pozzoleone (Vicenza) (IT)

( * ) Notice: Subject to any disclaimer, the term of this patent is extended or adjusted under 35 U.S.C. 154(b) by 0 days.

(21) Appl. No.: 15/566,882

(22) PCT Filed: May 27, 2016

(86) PCT No.: PCT/IB2016/053116
§ 371 (c)(1),
(2) Date: Oct. 16, 2017

(87) PCT Pub. No.: WO2016/193876
PCT Pub. Date: Dec. 8, 2016

(65) Prior Publication Data
US 2018/0111653 A1    Apr. 26, 2018

(30) Foreign Application Priority Data
May 29, 2015  (IT) .................... 102015000019527

(51) Int. Cl.
  *B62J 1/08*   (2006.01)
  *B62J 1/00*   (2006.01)
  *B62J 1/02*   (2006.01)
(52) U.S. Cl.
  CPC ........... *B62J 1/08* (2013.01); *B62J 1/007* (2013.01); *B62J 1/02* (2013.01)

(58) Field of Classification Search
  CPC ............ B62J 1/08; B62J 1/007; B62J 1/02
  USPC ................................................ 297/195.1
  See application file for complete search history.

(56) References Cited

U.S. PATENT DOCUMENTS

| 1,518,157 A | 12/1924 | Linder et al. | |
|---|---|---|---|
| 2004/0004374 A1* | 1/2004 | Garland | B62J 1/00 297/195.1 |
| 2010/0032996 A1* | 2/2010 | Lee | B62J 1/00 297/195.1 |
| 2011/0260510 A1* | 10/2011 | Hsu | B62J 1/08 297/201 |

FOREIGN PATENT DOCUMENTS

| JP | S426331 | 3/1967 |
|---|---|---|
| JP | S4421000 | 9/1969 |

OTHER PUBLICATIONS

International Search Report for PCT/IB2016/053116 dated Jul. 28, 2016 (2 pages).

* cited by examiner

*Primary Examiner* — Milton Nelson, Jr.
(74) *Attorney, Agent, or Firm* — Tutunjian & Bitetto, P.C.

(57) ABSTRACT

The present invention relates to a saddle for a vehicle, a bicycle or a motorcycle including a seating structure, a fork member secured below the seating structure and at least one anchoring component of each rear end of the fork member to the seating structure.

23 Claims, 5 Drawing Sheets

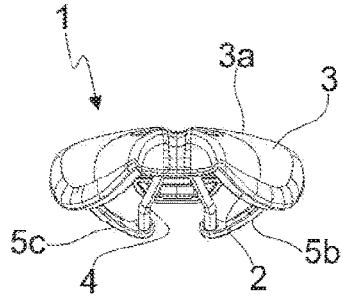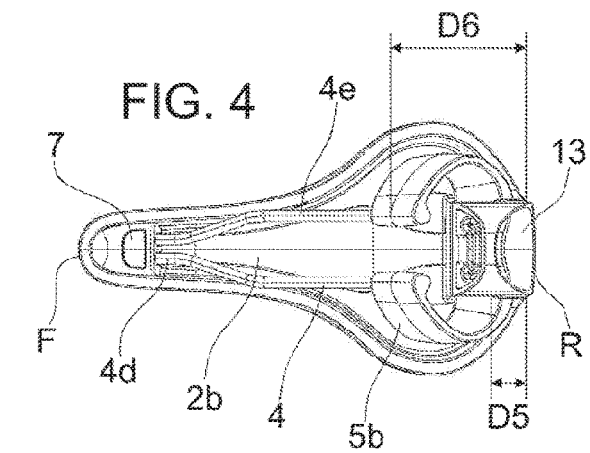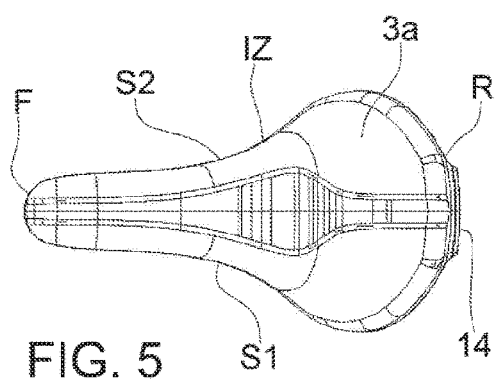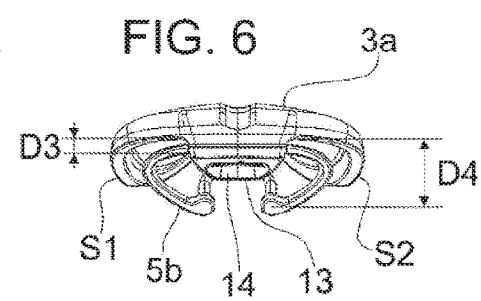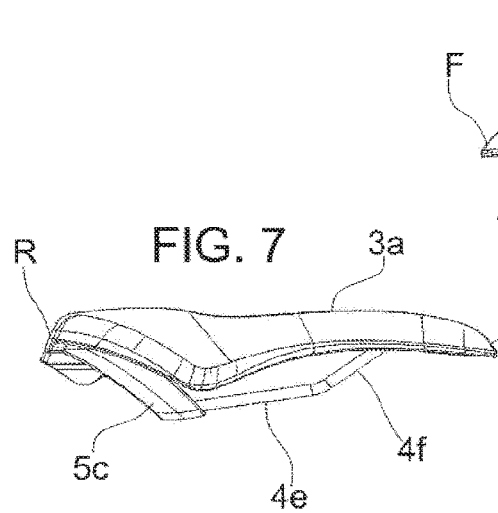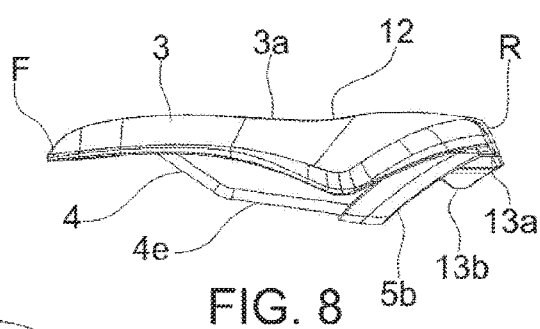

SADDLE FOR A VEHICLE

TECHNICAL FIELD OF THE INVENTION

The present invention relates to a novel saddle for a vehicle, such as a bicycle or a motorcycle, in particular an ergonomic saddle.

DESCRIPTION OF RELATED ART

Many saddles for vehicles have been proposed, which usually comprise a shell and padding connected to each other, as well as a fork constrained inferiorly to the group formed by shell and padding and constrainable to the seat post by means of special clamping jaws.

These saddles are usually not able to ensure an ergonomic support to a user, in particular taking into account the fact that the fork is anchored to the body at an area, in use, immediately below the ischial bone and therefore causes the application of localized reaction forces on the latter, such as to damage or cause annoyance to the user.

Moreover, the saddles proposed thus far have complex structures, particularly with reference to the means for coupling the fork to the shell.

JPS4421000Y1 and U.S. Pat. No. 1,518,157A disclose saddles according to the state of the prior art.

SUMMARY OF THE INVENTION

An object of the present invention is to provide a new saddle for vehicles, in particular for bicycles or motorcycles.

Another object of the present invention is to provide a novel saddle that is comfortable and ergonomic.

Another object of the present invention is to provide a novel saddle that does not cause strain on the ischial bones of a user in a harmful or annoying manner.

Another object of the present invention is to provide a novel saddle that ensures a good distribution of the user's weight.

Another object of the present invention is to provide a novel saddle that is less rigid than traditional saddles.

According to one aspect of the invention, a saddle according to the present application is provided.

The present application relates to preferred and advantageous exemplary embodiments of the invention.

BRIEF DESCRIPTION OF THE DRAWINGS

Further features and advantages of the invention will become apparent from the description of an exemplary embodiment of a saddle, shown by way of an indication in the accompanying drawings, in which:

FIGS. 3 to 8 are front, bottom, top, back view, from one side and from the other side, of the saddle of FIG. 1, respectively;

In the accompanying drawings, equal parts or components are designated by the same reference numerals.

DETAILED DESCRIPTION OF THE INVENTION

Figure 1:
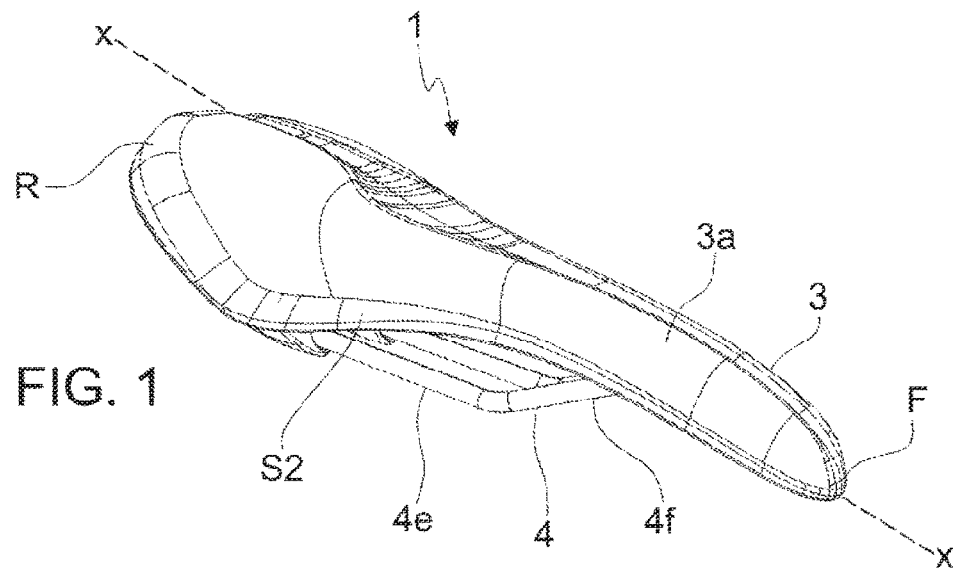
FIGS. 1 and 2 are perspective views, slightly from the top and from the bottom, respectively, of a saddle according to the present invention.
Figure 2:
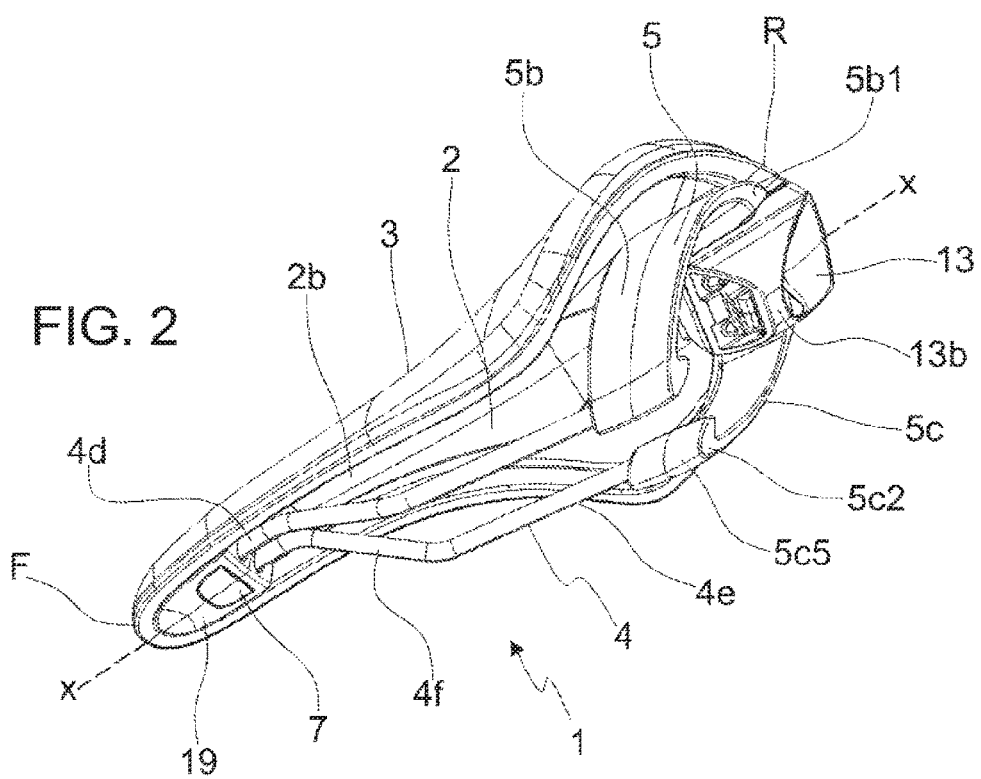

With reference to FIGS. 1 to 16, a saddle 1 according to the present invention is shown, for a vehicle, a bicycle or a motorcycle, which includes a seating structure 2, 3 and a fork member or rail 4 secured below the seating structure 2, 3 or better to a base component 2 of the same.

In detail, with regards to the seating structure, it may advantageously include a base component or shell 2 as well as a padding component 3 mounted on and partially around the base component or shell 2. To this end, the padding component 3 may be removably connected to the base component 2, or attached to it, such as glued or molded, possibly by injection, onto it. Moreover, the padding component 3 may be substantially in one piece or have an external cover element wrapping an actual padding element of soft material.

The saddle 1 preferably has then a longitudinal symmetry axis x-x, in which case such axis is a longitudinal symmetry or front F-rear R axis at least of the base component 2, of the padding component 3 and of the fork member 4.

More in particular, the base component 2 comprises an upper, in use, surface 2a as well as a lower, in use, surface 2b while the padding component comprises an upper, in use, face 3a and a lower, in use, face 3b designed to engage, the upper, in use, surface 2a of the base component 2, such as abutting on or facing towards it. Preferably, the upper surface 2a of the base component 2 is substantially configured as the lower face 3b of the padding component 3, so that the same, once saddle 1 has been assembled, can be engaged or abutted against each other by the entire extension thereof.

Moreover, the upper surface 3a of the padding component 3 is, in use, substantially free and designed to be the seating surface for a user.

Preferably, the padding component 3 is made of a soft material and, in particular, softer than the base component 2. For example, the padding may be made of a material such as polyurethane foam, an elastomeric material or the like.

Moreover, the padding component 3 can have a first side wall 3g extending, in use, downwards past the lower face 3b and optionally by the entire annular perimeter of the padding component 3, so as to define with the lower face 3b a receiving and partial wrapping area RZ of the base component 2, or better of the upper surface 2a thereof and optionally, of part of the sides of the same. Moreover, also the base component 2 may have a second side wall 2g extending, in use, downwards past the lower surface 2b and optionally by the entire annular perimeter of the base component 2, which second side wall 2g is wrapped, at least partially, by the first side wall 3g.

As regards the fork member 4, it has a pair of prongs 4a, each having a rear end 4b, in use, and a front end 4c, in use. The front ends 4c of prongs 4a are constrained to the seating structure 2, 3 or better to a base component 2 of the same, such as will be better described hereinafter. Moreover, if desired, the front ends 4c of the prongs are joined bridge-like by a U-shaped connecting portion 4g.

Moreover, saddle 1 comprises an anchoring or suspension component 5 of each rear end 4b of prongs 4a of the fork member 4 to the seating structure 2, 3.

The anchoring or suspension component 5 optionally has a substantially C-shaped structure.

The anchoring component 5 is connected to the seating structure 2, 3 or better to the base component 2 of the same at a zone of constraint 5a and is configured in such a way that the rear ends 4b of the fork member 4 are connected to the anchoring component 5 at a distance D2 one from the other smaller than the width D1 (see for example FIG. 11) of the zone of constraint 5a and/or at a distance D6 from the rear R greater than the distance of the zone of constraint 5a from the rear R (see for example FIG. 4).

The anchoring component 5 may be of a plastic material, such as charged or non-charged thermoplastic, or metal or composite material.

More in particular, according to the non-limiting exemplary embodiment shown in the figures, the anchoring component 5 comprises two wing sections 5b, 5c, each wing section 5c having a first end 5b1, 5c1 proximal to and of constraint for the seating structure 2, 3 and a second end 5b2, 5c2 distal from the seating structure. Advantageously, the anchoring component 5 comprises an intermediate section 5a, defining the zone of constraint, connected to the seating structure 2, 3 as well as two wing sections 5b, 5c, each wing section 5b, 5c extending starting from the intermediate section 5a and having a first end 5b1, 5c1 proximal or of connection/coupling to the intermediate section 5a as well as a second end 5b2, 5c2 distal from the intermediate section 5a. More in particular, the anchoring component 5 is connected directly to or in contact with the seating structure 2, 3, or rather with the base component 2 of the same, for example with the lower surface 2b of the base component 2.

The first ends 5b1, 5c1 of the wing sections 5b, 5c are at a first distance D1 one with respect to the other, while the second ends 5b2, 5c2 of the wing sections 5b, 5c are at a second distance D2 one with respect to the other smaller than the first distance D1. A fork may be created with this expedient having with rear ends 4b of the respective prongs 4a at a smaller distance than the length of the zone of constraint 5a of the anchoring component 5, which also ensures greater flexibility of the sides or side portions of the saddle in use compared to the prior art solutions.

Moreover, each second end 5b2, 5c2 of the wing sections 5b, 5c delimits an engagement seat 6, open towards the front F and/or towards the rear R of the saddle and optionally blind and not through, of a respective rear end 4b of a respective prong 4a of the fork member 4. Preferably, the engagement seat 6 has a main axis of insertion horizontal or inclined with rear end or end proximal to the rear R at a level lower than the respective front end or end distal from the rear R, this in particular for the constraint to a fork which will be described hereinafter.

Optionally (see FIG. 6), the first ends 5b1, 5c1 of the wing sections 5b, 5c are at a third distance D3 from the seating structure 2, 3, in particular from the lower surface 2b of the base component 2, equal to or greater than zero, while the second ends 5b2, 5c2 of the wing sections 5b, 5c are at a fourth distance D4 from the seating structure 2, 3, in particular from the lower surface 2b of the base component 2; the fourth distance D4 is greater than the third distance D3. The difference between the fourth distance D4 and the third distance D3 corresponds, in essence, to the height of the anchoring component 5.

Advantageously, each wing section 5b is substantially curved with concave side facing towards the other wing section 5c or towards axis x-x.

Even more advantageously (see for example FIG. 9), the wing sections 5b, 5c have a first segment 5b3, 5c3 substantially aligned or with a first inclination or curvature with respect to the intermediate section 5a and then a second segment 5b4, 5c4 with a second inclination or curvature with respect to the intermediate section 5a greater than the first inclination or curvature, so that each wing section 5b, 5c extends laterally from the intermediate section 5a in substantial alignment or with a first inclination or curvature with respect to the intermediate section 5a until reaching a maximum width and then each wing section 5b, 5c develops in the direction of its middle or of axis x-x with a second inclination or curvature greater than the first inclination or curvature.

According to the non-limiting example shown in the figures, the first ends 5b1, 5c1 of the wing sections 5b, 5c are at the rear R of the seating structure 2, 3 or at a fifth distance D5 from it, while the second ends 5b2, 5c2 of the wing sections 5b, 5c are at a sixth distance D6 from the rear R of the seating structure 2, 3 greater than the fifth distance D5 of the first ends 5b1, 5c1 from the rear R, that is to say that the wing sections 5b, 5c move away from the rear R when passing from the respective first 5b1, 5c1 to the respective second 5b2, 5c2 ends.

Due to these measures, prongs 4a of fork 4 are constrained to the anchoring component 5 away or at a distance D6 from the rear R of the structure and/or away or at a distance D4 from the seating structure 2, 3 or better from the lower surface 2b of the base component 2 thereof, resulting in greater comfort of the saddle, since the fork member 4 or better the rear ends 4b of the same do not bump or engage the seating structure while cycling or using the saddle or in any case, are not immediately below the ischial bones of a user during use, which also allows greater comfort and greater flexibility or elasticity of the base component 2 while cycling, because the same is not inferiorly hampered by prongs 4a of fork 4.

According to a variant, the anchoring component 5 may be structured differently, such as having wing sections with concavity facing outwards or away from the other wing section but optionally always such as to have distance D1 greater than D2 and/or distance D4 greater than D3 and/or distance D6 from the rear R greater than distance D5 between the first ends 5b1, 5c1 and the rear R.

Advantageously, the wing sections 5b, 5c comprise a substantially curved plate with substantially constant thickness and diameter and having at the second end 5b2, 5c2 a bulge 5b5, 5c5 delimiting a respective engagement seat 6. Optionally, the whole anchoring or suspension component 5 comprises a plate with substantially constant thickness and diameter.

Moreover, the intermediate section 5a may have a smaller width than the wing sections 5b, 5c, so as to define a recess portion 5e with the first ends 5b1, 5c1 of the same.

The intermediate section 5a may be connected for example by means of screws or bolts or similar means to the seating structure, or rather to the base component 2 thereof or, as an alternative, it may be connected by fitting means to the seating structure or to the base component 2 or clamped between the seating structure or the base component 2 and a mask component fixed by means of screws, bolts or fitting means to the seating structure or to the base component 2. According to the non-limiting example shown in the figures, two or more first through holes 5d may be formed in the intermediate section 5a (two in the exemplary embodiment), while two or more second through holes 2d are formed in the base component 2, in particular at a rear zone of the same, which in use are each aligned with a respective hole 5d and then a respective screw 15 (shown in FIG. 10) is inserted in the pairs of holes 2d, 5d thus aligned, locking screws 15 into position, for example by means of a respective bushing 16 or nut.

To this end, according to the non-limiting embodiment example shown in the figures, starting from the lower surface 2b of the base component 2, in particular at the rear R, a raised portion 18 erects, in use, downwards, optionally integral with the base component 2, which raised portion 18 forms a support or abutment section of the intermediate section 5a of the anchoring component 5. More in particular, fencing or delimiting walls 18a, 18b may be provided in the positioning zone of the intermediate section 5a of the anchoring component 5, so that the intermediate section 5a can be inserted or fitted between the fencing walls 18a, 18b.

Figure 9:
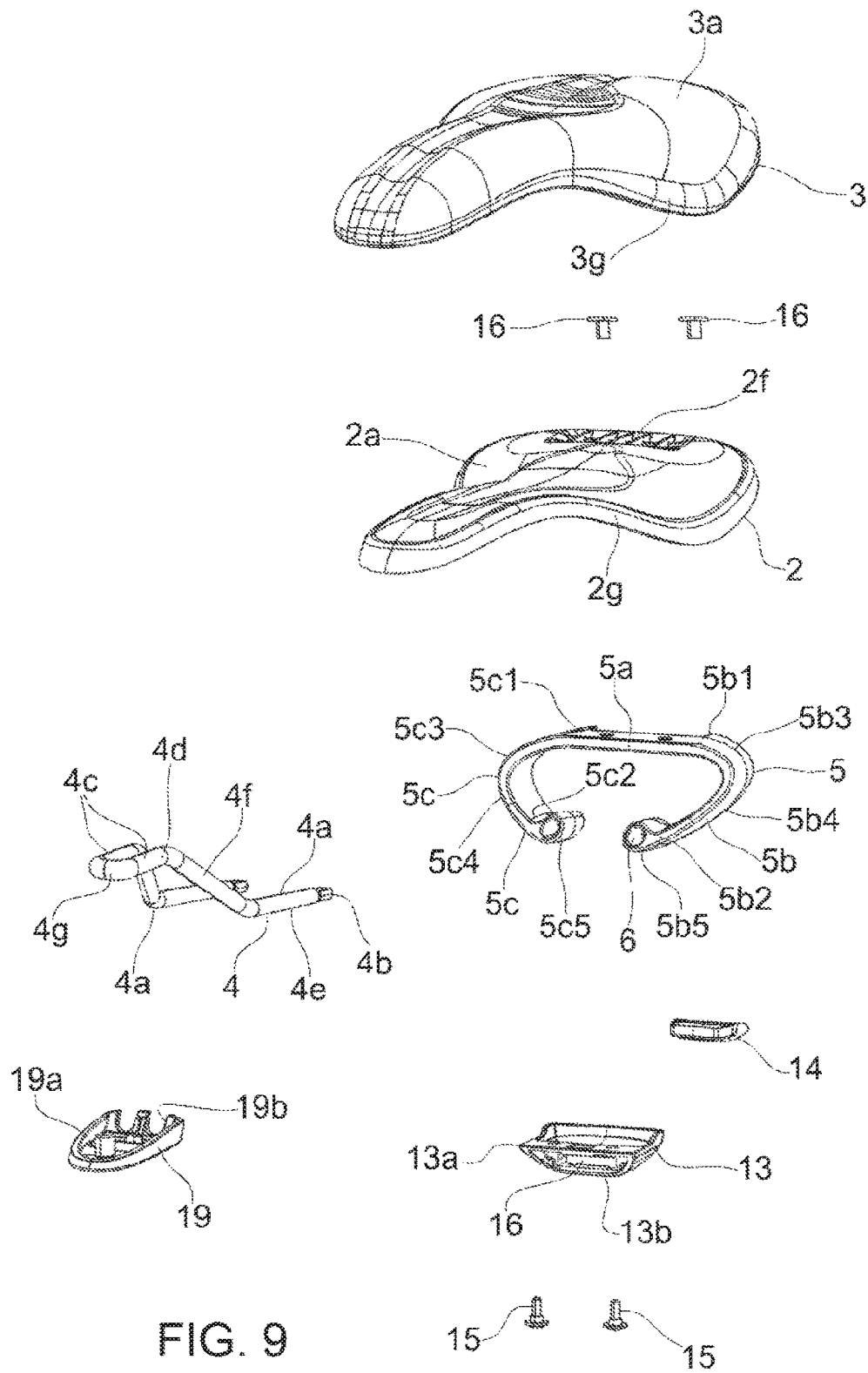
FIGS. 9 and 10 are exploded views from the top and from the bottom, respectively, of the saddle of FIG. 1.

Moreover, the zone of the base component 2 from which the raised portion 18 projects may have a lighter part 2f or a part with reduced thickness (see FIG. 9).

The wing sections 5b, 5c of the anchoring component 5 are substantially symmetrical with respect to the symmetry axis x-x or rather with respect to a vertical plane, in use, passing by the same.

The anchoring component 5 is preferably made in one piece. According to a variant, the anchoring component may comprise multiple parts assembled together or to the seating structure, in which case the two wing sections 5b, 5c may not be connected directly to each other, but each separately bound to the seating structure or to the base component 2.

As regards the fork member 4, advantageously, the distance of the same from the seating structure or rather from the lower surface 2b of the base component 2 may increase in the passage from the front ends 4c to the rear ends 4b of the fork member 4, and thus not have end or rear sections with distance from the seating structure smaller with respect to the front sections of the same.

Figure 16:
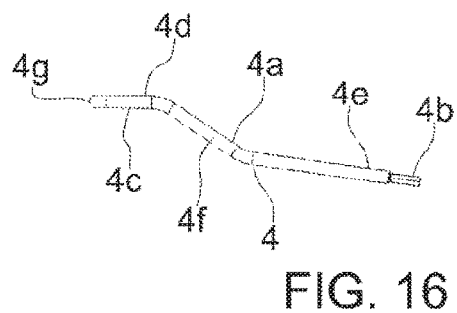

The fork member 4 may for example, as shown in FIG. 16, have a first front section 4d constrained to the seating structure 2, 3 and a second rear section 4e terminating in a substantially shank-shaped portion defining a respective rear end 4b. The substantially shank-shaped portion 4b is fitted, in use, in a second end 5b2, 5c2 of a respective wing section 5b, 5c or rather in an engagement seat 6 delimited by the same. In this case, the second rear section 4e of prongs 4a has a distance from the seating structure 2, 3, or rather from the lower surface 2b of the base component 2 of the same, which is growing in the front F-rear R direction, or moving away from the respective first front section 4d.

According to this variant, optionally, each first section 4d and/or each second section 4e of each prong 4a is/are substantially rectilinear or slightly curved. Moreover, the first sections 4d are preferably substantially parallel and the first section 4d of a prong 4a is at a seventh distance D7 from the first section 4d of the other prong 4a. Optionally, the second sections 4e are substantially parallel and the second section 4e of a prong 4a is at an eighth distance D8 from the second section 4e of the other prong 4a, the eighth distance D8 being greater than the seventh distance D7.

Optionally, each prong 4a of the fork member 4a has a third connection section 4f of a first front section 4d with a respective second rear section 4e, the third connection section 4f having a distance from the seating structure 2, 3 growing as it moves away from the respective first front section 4d, for example with greater inclination, with respect to the respective first section 4d, than the inclination of the second section 4e with respect to the latter (first section 4d).

The third connection section 4f, if present, of a prong 4a may be at a distance from the third connection section 4f of the other prong 4a growing as it moves away from the respective first front section 4d and approaching the respective second rear section 4e.

The fork member 4 is made in a single piece, for example starting from a rod or the like suitably bent or shaped.

Prongs 4b of the fork member 4 are substantially symmetrical with respect to the symmetry axis x-x or rather with respect to a vertical plane, in use, passing by the same.

Figure 10:
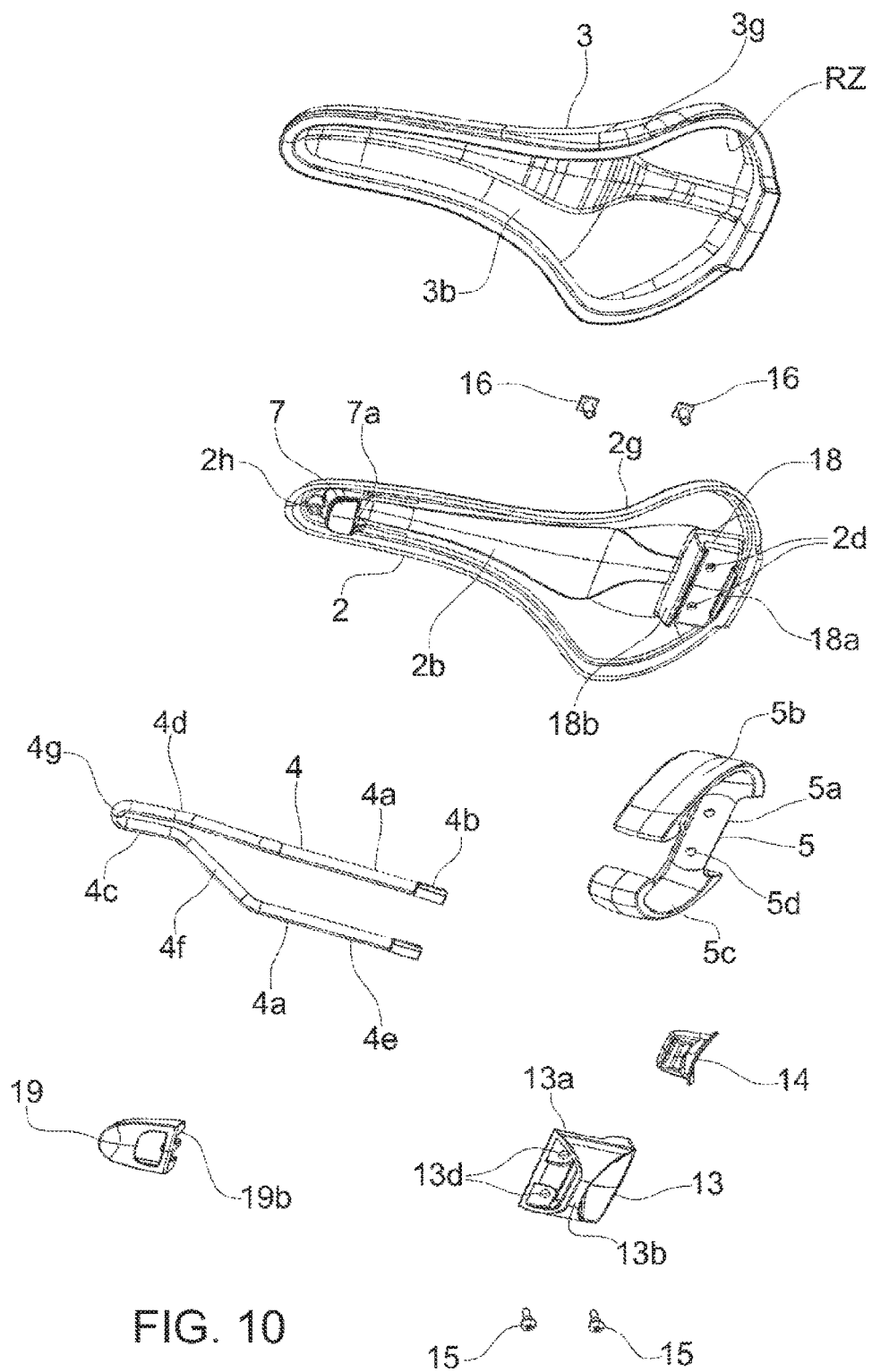
Figure 11:
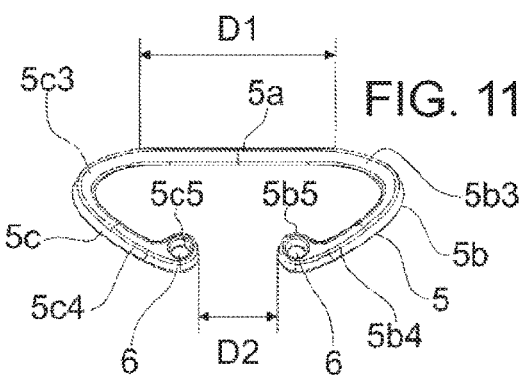
FIGS. 11 to 14 are front, side, top and back views, respectively, of an anchoring component of the saddle of FIG. 1.
Figure 12:
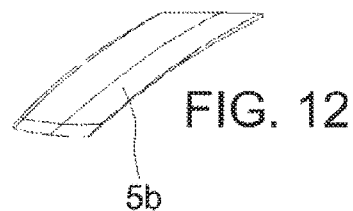
Figure 13:
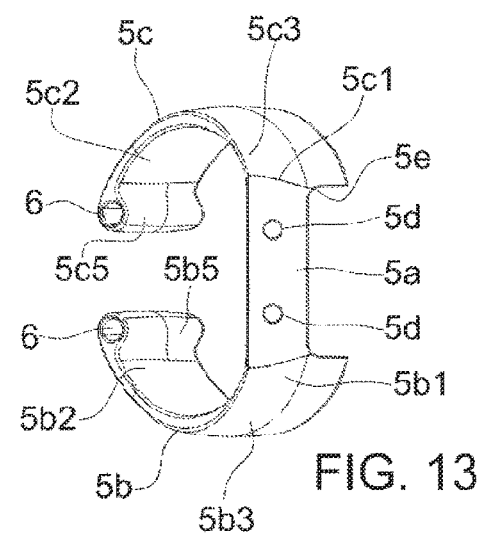
Figure 14:
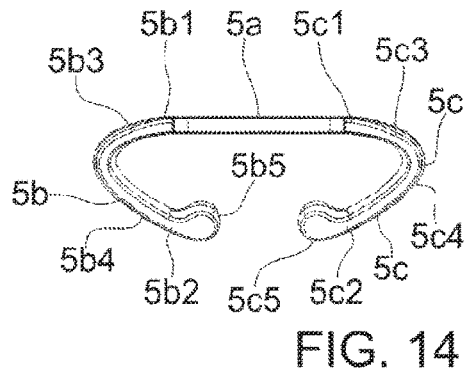
Figure 15:
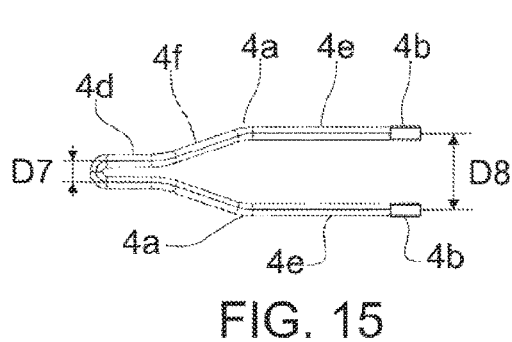
FIGS. 15 and 16 are top and side views, respectively, of a fork member of the saddle of FIG. 1.

As shown for example in FIG. 10, the seating structure 3, 2 or rather the base component 2 of the same may have at the bottom a raised portion 7 which delimits a recess 7a open towards the rear R of the saddle, in which case the front ends 4c of prongs 4a or the U-shaped connecting portion 4g of the same are engaged or fit-inserted into recess 7a. According to the non-limiting embodiment example in the figures, the raised portion 7 extends starting from the lower surface 2b of the base component 2 and optionally, is formed in a single piece with it.

Advantageously, the connecting zone of the front ends 4c of the fork member 4 to the seating structure is substantially aligned with the connecting zone of the anchoring component 5 to the seating structure. Even more advantageously, the raised portion 7 is substantially aligned with the connecting zone of the intermediate section 5a, for example of the free surface of the raised portion 18, if present.

Moreover, the saddle may comprise a covering or masking element 19 of the raised portion 7, which masking element 19 is constrainable to the base component 2, for example by the introduction of a pin 19a into a hole 2h delimited by the base component 2 or vice versa. Moreover, the covering or masking element 19, if provided, delimits a pair of slots 19b for the passage, without engagement or without constraint, of a respective section of prongs 4a of the fork member 4.

According to the exemplary embodiment shown in the figures, the seating structure has a front or tip F substantially tapered, a rear R with width wider than tip P and an intermediate zone IZ of growing width when passing from tip F to the rear R. Optionally, both the base component 2 and the padding component 3 have such a configuration, although the padding component 3 may be slightly larger than the base component 2 so as to delimit the receiving and partial wrapping zone RZ of the same.

Moreover, as mentioned, the seating structure may also have a first substantially annular side wall 3g so as to define a substantially continuous flap protruding downwards starting from the lower face 3b. To this end, the first side wall 3g may have a variable height, i.e. distance from the lower face 3b, and more in particular, maximum height at the sides S1, S2 of the saddle.

Advantageously, between tip F and the intermediate zone IZ or at the intermediate zone IZ, a step or offset 12 is delimited, intended to prevent the slipping towards the rear R of a user sitting on saddle 1.

The saddle may also comprise a block component 13 fixed to a lower surface 2b of the seating structure and defining therewith a locking or tightening seat of the anchoring component 5. The block component 13 advantageously comprises female component of a quick coupling structure or ICS of a fitting or part of a fitting, where fitting means, for example, a bag, a handle, a bottle holder, a light, etcetera. In this case, the saddle may also include a fitting 14 (a closing component according to the exemplary embodiment shown in the figures) constrained, for example, to said fixing structure 13.

According to the non-limiting embodiment example shown in the figures, the block component 13 has a base plate 13*a*, optionally substantially flat, starting from an outer or lower surface of which, in use, a bridge element 13*b* projects, delimiting a preferably through opening 16, which may have the function of female part of an ICS in which a fitting 14, or rather a part of the same, may be inserted or fit-inserted. One or more through holes 13*d* may be formed in the base plate 13*a* (for example shown in FIG. 10) intended, in use, to be aligned with holes 2*d*, 5*d* for introducing a screw 15 and a bushing 16 or nut.

A saddle according to the present invention is therefore more comfortable and ergonomic compared to the prior art solutions, as well as more flexible, particularly at its sides.

Such advantages are obtained due to the configuration of the anchoring component and of the fork member, which components, in fact, cooperate so as to form a substantially annular fork that does not bump into or engages portions of the saddle in turn intended to engage the ischial bones of a user.

It should also be taken into account that the configuration of the anchoring component allows easy accommodation and engagement of a quick coupling structure.

Moreover, a saddle according to the present invention, in particular the seating structure thereof, may be made in different sizes and shapes, although all with the structural features described above or at least with the essential features of a saddle according to the present invention, and for example with a slightly narrower seating structure for an "Athletic" saddle, one with an intermediate seating structure to obtain a so-called "Moderate" saddle, and a third one with wider seat for a so-called "Relaxed" saddle.

Changes and variants of the invention are possible within the scope of protection as defined by the claims.

The invention claimed is:

1. A saddle for a vehicle, a bicycle or a motorcycle comprising:
   a seating structure,
   a fork member secured below said seating structure, said fork member having a pair of prongs each having a rear end as well as a front end, said front ends of said prongs being constrained to said seating structure,
   at least one anchoring component for receiving each rear end of said fork member, wherein said at least one anchoring component is connected to said seating structure,
   wherein said at least one anchoring component comprises two wing sections, each wing section having a first end proximal to and of constraint for said seating structure and a second end distal from said seating structure, and wherein each second end of said wing sections delimits an engagement seat of a respective rear end of a respective prong of said fork member,
   wherein said first ends of each of said wing sections are positioned at a first distance (D1) with respect to each other, while said second ends of each of said wing sections are positioned at a second distance (D2) with respect to each other, wherein the second distance (D2) is smaller than said first distance (D1),
   wherein said at least one anchoring component is connected to said seating structure at a zone of constraint and is configured in such a way that each of said rear ends of said fork member are connected to respective second ends of said wing sections,
   wherein said at least one anchoring component comprises an intermediate section connected to said seating structure and defining said zone of constraint and wherein each wing section extends starting from said intermediate section and has a first end proximal to said intermediate section and a second end distal from said intermediate section, and
   wherein said intermediate section is connected by means of screws or bolts or fitting means to said seating structure or said intermediate section is clamped between said seating structure and a mask component fixed by means of screws, bolts or fitting means to said seating structure.

2. The saddle according to claim 1, wherein said at least one anchoring component is made in one piece.

3. The saddle according to claim 1, comprising a block component fixed to a lower surface of said seating structure and defining with said seating structure a locking or tightening space of said anchoring component.

4. The saddle according to claim 3, wherein said block component comprises a female component of a quick coupling structure of a fitting or part of a fitting.

5. The saddle according to claim 4, comprising a fitting linked or fixed to said quick coupling structure.

6. The saddle according to claim 1, wherein said first ends of said wing sections are at a third distance (D3) from said seating structure, while said second ends of said wing sections are at a fourth distance (D4) from said seating structure greater than said third distance (D3).

7. The saddle according to claim 1, wherein each wing section is substantially curved with concavity facing towards the other wing section or facing outwards or away from the other wing section.

8. The saddle according to claim 7, wherein said wing sections have a first segment substantially aligned or with a first inclination or curvature with respect to said intermediate section and then a second segment with a second inclination or curvature with respect to said intermediate section greater than said first inclination or curvature, so that each wing section extends laterally from said intermediate section in substantial alignment or with a first inclination or curvature with respect to said intermediate section until reaching a maximum width and then each wing section extends towards a direction of its center with a second inclination or curvature greater than said first inclination or curvature.

9. The saddle according to claim 1, wherein said first ends of said wing sections are at the rear (R) of said saddle or of said seating structure or at a distance (D5) from said rear (R), while said second ends of said wing sections are at a distance (D6) from said rear (R) of said seating structure greater than said distance (D5), that is to say that said wing sections move away from said rear (R) when passing from the respective first to the respective second ends.

10. The saddle according to claim 1, wherein said wing sections comprise a substantially curved plate with substantially constant thickness and diameter and having at said second end a bulge delimiting a respective engagement seat.

11. The saddle according to claim 1, wherein each prong of said fork member has a first front section constrained to said seating structure and a second rear section terminating in a substantially shank-shaped portion defining a respective rear end, said substantially shank-shaped portion being fitted, in use, in a second end of said anchoring component, and wherein said second rear section has a distance from said seating structure growing as it moves away from the respective first front section.

12. The saddle according to claim 11, wherein the first front sections of said prongs are substantially parallel, wherein each of said first sections of said prongs is at a distance (D7) from each other, wherein the second rear sections of said prongs are substantially parallel, wherein each of said second sections of said prongs is at a distance (D8) from each other, and wherein said distance (D8) is greater than said distance (D7).

13. The saddle according to claim 11, wherein each prong of said fork member has a third connection section for connecting a first front section with a respective second rear section, said third connection section having a distance from said seating structure which increases as it moves away from the respective first front section.

14. The saddle according to claim 13, wherein each of said third connection section of each prong is at a distance from each other which increases as it moves away from the respective first front section and approaching the respective second rear section.

15. The saddle according to claim 11, wherein said engagement seat has a main axis of insertion horizontal or inclined with rear end or end proximal to the rear at a level lower than the respective front end or end distal from the rear.

16. The saddle according to claim 1, wherein the distance of said fork member from said seating structure increases in passing from said front ends to said rear ends.

17. The saddle according to claim 1, wherein said seating structure has at a bottom a raised portion which delimits a recess open towards the rear (R) of said saddle, said front ends of said prongs or a U-shaped connecting portion of the front ends of said prongs being engaged or fitted in said recess.

18. The saddle according to claim 1, wherein said seating structure comprises a base component or shell as well as a padding component mounted over and partially around said base component or shell, said base component comprising an upper surface, as well as a lower surface, with said padding component comprising an upper face and a lower face designed to engage said upper surface of said base component.

19. The saddle according to claim 1, wherein said seating structure has a tip (F) substantially tapered, wherein the rear (R) has a width wider than said tip (F) and an intermediate zone (IZ) of growing width when passing from said tip (F) to said rear (R) and wherein between said tip (F) and said intermediate zone (IZ) or at said intermediate zone (IZ) a step or offset is delimited intended to prevent slipping towards the rear (R) of a user sitting on the saddle.

20. The saddle according to claim 1, wherein said engagement seat is open towards the front (F) and/or towards the rear (R).

21. A saddle for a vehicle, a bicycle or a motorcycle comprising:
a seating structure,
a fork member secured below said seating structure, said fork member having a pair of prongs each having a rear end as well as a front end, said front ends of said prongs being constrained to said seating structure,
at least one anchoring component for receiving each rear end of said fork member, wherein said at least one anchoring component is connected to said seating structure,
wherein said at least one anchoring component comprises two wing sections, each wing section having a first end proximal to and of constraint for said seating structure and a second end distal from said seating structure, and wherein each second end of said wing sections delimits an engagement seat of a respective rear end of a respective prong of said fork member,
wherein said first ends of each of said wing sections are positioned at a first distance (D1) with respect to each other, while said second ends of each of said wing sections are positioned at a second distance (D2) with respect to each other, wherein the second distance (D2) is smaller than said first distance (D1),
wherein said at least one anchoring component is connected to said seating structure at a zone of constraint and is configured in such a way that each of said rear ends of said fork member are connected to respective second ends of said wing sections,
wherein said at least one anchoring component comprises an intermediate section connected to said seating structure and defining said zone of constraint and wherein each wing section extends starting from said intermediate section and has a first end proximal to said intermediate section and a second end distal from said intermediate section,
wherein each wing section is substantially curved with concavity facing towards the other wing section or facing outwards or away from the other wing section, and
wherein said wing sections have a first segment substantially aligned or with a first inclination or curvature with respect to said intermediate section and then a second segment with a second inclination or curvature with respect to said intermediate section greater than said first inclination or curvature, so that each wing section extends laterally from said intermediate section in substantial alignment or with a first inclination or curvature with respect to said intermediate section until reaching a maximum width and then each wing section extends towards a direction of its center with a second inclination or curvature greater than said first inclination or curvature.

22. A saddle for a vehicle, a bicycle or a motorcycle comprising:
a seating structure,
a fork member secured below said seating structure, said fork member having a pair of prongs each having a rear end as well as a front end, said front ends of said prongs being constrained to said seating structure,
at least one anchoring component for receiving each rear end of said fork member, wherein said at least one anchoring component is connected to said seating structure,
wherein said at least one anchoring component comprises two wing sections, each wing section having a first end proximal to and of constraint for said seating structure and a second end distal from said seating structure, and wherein each second end of said wing sections delimits an engagement seat of a respective rear end of a respective prong of said fork member,
wherein said first ends of each of said wing sections are positioned at a first distance (D1) with respect to each other, while said second ends of each of said wing sections are positioned at a second distance (D2) with respect to each other, wherein the second distance (D2) is smaller than said first distance (D1),
wherein said at least one anchoring component is connected to said seating structure at a zone of constraint and is configured in such a way that each of said rear ends of said fork member are connected to respective second ends of said wing sections,
wherein the distance of said fork member from said seating structure increases in passing from said front ends to said rear ends.

23. A saddle for a vehicle, a bicycle or a motorcycle comprising:
- a seating structure,
- a fork member secured below said seating structure, said fork member having a pair of prongs each having a rear end as well as a front end, said front ends of said prongs being constrained to said seating structure,
- at least one anchoring component for receiving each rear end of said fork member, wherein said at least one anchoring component is connected to said seating structure,
- wherein said at least one anchoring component comprises two wing sections, each wing section having a first end proximal to and of constraint for said seating structure and a second end distal from said seating structure, and wherein each second end of said wing sections delimits an engagement seat of a respective rear end of a respective prong of said fork member,
- wherein said first ends of each of said wing sections are positioned at a first distance (D1) with respect to each other, while said second ends of each of said wing sections are positioned at a second distance (D2) with respect to each other, wherein the second distance (D2) is smaller than said first distance (D1),
- wherein said at least one anchoring component is connected to said seating structure at a zone of constraint and is configured in such a way that each of said rear ends of said fork member are connected to respective second ends of said wing sections,
- wherein said wing sections comprise a substantially curved plate with substantially constant thickness and diameter and having at said second end a bulge delimiting a respective engagement seat.

* * * * *